E. B. KOOPMAN & W. W. McKENNEY.

Assignors to THE MAGIC INTRODUCTION COMPANY.

POCKET LAMP OR LIGHTING DEVICE.

No. 11,130. Reissued Dec. 9, 1890.

INVENTORS

Elias B. Koopman. Wm. W. McKenney.

By Marble, Macon & Raufield.

Attorneys.

WITNESSES:

E. B. Bolton

C. L. Davis

UNITED STATES PATENT OFFICE.

ELIAS B. KOOPMAN AND WILLIAM W. McKENNEY, OF NEW YORK, N. Y., ASSIGNORS TO THE MAGIC INTRODUCTION COMPANY, OF SAME PLACE.

POCKET LAMP OR LIGHTING DEVICE.

SPECIFICATION forming part of Reissued Letters Patent No. 11,130, dated December 9, 1890.

Original No. 440,265, dated November 11, 1890. Application for reissue filed November 15, 1890. Serial No. 371,615.

*To all whom it may concern:*

Be it known that we, ELIAS B. KOOPMAN and WILLIAM W. McKENNEY, citizens of the United States, residing at the city of New York, in the county of New York and State of New York, have invented certain new and useful Improvements in Pocket Lamps or Lighting Devices, of which the following is a full, clear, and exact description, reference being had to the accompanying drawings, forming part thereof, in which similar letters of reference designate like or equivalent parts wherever found throughout the several views.

This invention relates to that class of lamps or lighting devices which are designed to be carried in the pocket, and may be used for lighting cigars, lamps, gas-burners, and many other similar purposes; and the invention, which is fully disclosed in the following specification, is an improvement on the construction shown in United States Letters Patent No. 414,058, issued to Elias B. Koopman, one of the applicants herein, October 29, 1889.

Figure 1:
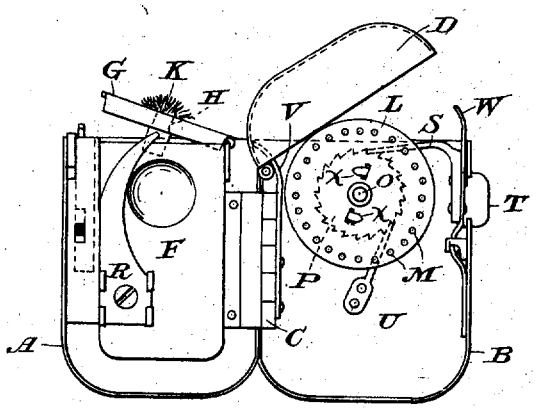
Figure 3:
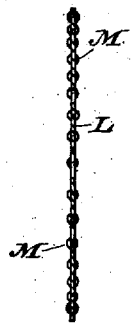
Figure 2:
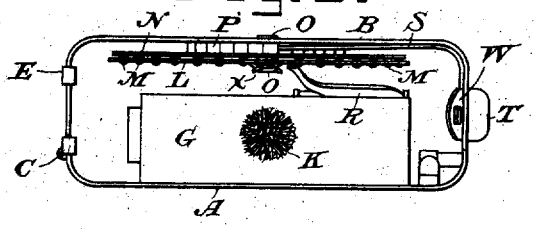

In the accompanying drawings, which form part of this specification, Figure 1 represents in elevation our improved lighting device as it appears when opened. Fig. 2 represents a top plan view of the same, the cover being removed; and Fig. 3 represents a central vertical section of our improved ignitible pellet or fulminate carrier.

Referring to the drawings, A and B represent the separate sides of our improved pocket-lamp or lighting device, which are hinged together at C, and D is the cover hinged to the back, which in this case is formed integral with the side B at E. The lamp is preferably substantially rectangular in cross-section, as shown in Fig. 2, and to one of the side portions is attached the reservoir F, in which is placed the burning fluid or agent. This reservoir is provided with a hinged cover G, through which passes a wick-tube H. The reservoir F is filled with an absorbent material, and a wick K is in contact therewith and extends up through the wick-tube and cover, as shown in Figs. 1 and 2, in such manner as to bring the wick into close proximity with the ignitor when the sides of the lamp are closed.

The ignitor-disk L is composed of a disk of paper, cloth, card-board, or other suitable material, upon which are arranged in a circle a number of pellets, drops, or bits of fulminate or explosive material or composition M. These pellets are in our improvement arranged in a circle on each side of the disk and preferably near the edge thereof.

The disk-carrier, to which the ignitor-disk L is attached, consists of a wheel N, mounted upon a pin or pinion O, which is attached to or extends through the side B of the case, and formed upon or attached to the carrier-disk N is a circular ratchet or toothed wheel P, (shown in dotted lines in Fig. 1,) the carrier and ratchet being so united or constructed as to turn together on the pinion O. The ignitible pellets or fulminates are so spaced as to correspond in position with the teeth of the ratchet, so that a fulminate is presented to the scratcher or ignitor at each movement of the carrier as the same is intermittently revolved. These ignitible pellets or fulminates are ignited by a spring-scratcher R, cut or stamped from spring metal, preferably steel, and curved, as shown, one end of which is attached to the reservoir in such a position that the upper free end thereof when the sides of the case are closed together comes in contact with the disk L and the pellets or fulminates arranged thereon, and as the carrier is advanced step by step the fulminates are ignited as they pass under the end of the scratcher, and the wick K is ignited.

The means employed by us to rotate the carrier consists of the spring-pawl S, one end of which is attached to or is in contact with the push-button T and the outer end of which engages the teeth on the ratchet-wheel P, and a spring U, attached to the side B of the casing, also engages the ratchet and prevents its retroaction when freed from the spring-pawl S. A spring V is attached to the back of the casing in such a manner as to act upon the cover and open the same when released from engagement with the spring W, attached to or in contact with the push-button T, by which the spring W is operated and the lamp opened. It will thus be seen that the same movement that releases and throws open the cover also rotates the carrier, explodes a fulminate, and lights the lamp.

The carrier-disk N, which carries the fulminate-disk L, is provided with projecting spring-fingers X X, preferably of ogee shape, as shown, the free ends of which extend in opposite directions and are curved outward, the pinion O also extending in the same direction to a distance equal to or greater than that to which such fingers X X extend. These fingers X X are preferably arranged on the carrier-disk N in line with the central opening through which the pinion O passes, and the ignitor-disk L is provided with openings or perforations which correspond with the positions of the pinion O, on which the carrier-disk N is mounted, and of the projecting fingers X X upon said carrier-disk N.

In placing the disk L in position upon the carrier-disk N it is only necessary to press the same down in the direction of the carrier till the pinion O passes through the central opening, and then gently rotate and press upon it until the spring-fingers X X pass through the corresponding openings therein, when by giving the disk L another slight rotation the fingers will pass farther through said openings, and thus hold the disk L snugly against the carrier-disk N and the fingers X X, and the disk L will then be in the position shown in Figs. 1 and 2. The extension of the pinion O beyond the fingers X X aids materially in this operation.

By providing the disk L with pellets or fulminates on each of its sides and so constructing the disk as to admit of its being reversed upon the carrier and held securely in place in either position, the ignitible pellets or fulminates being so arranged on either side of the disk L as to be exploded or ignited by the same automatic devices when the disk is in proper position, a great advantage is secured over the construction shown in the patent hereinbefore referred to, not only in the value of the lamp and in the cost of its construction, but also in the practical use thereof. It is also a great advantage over the construction shown in the patent hereinbefore referred to to provide a reservoir with a hinged cover and a wick which passes up through the cover in such manner as to bring the wick into proximity to the ignitor when the sides of the lamp are closed, as herein shown and described.

It is evident that many changes may be made in the details of construction and the arrangement of the parts of our lamp without departing from the scope of our invention, and we do not limit ourselves to the exact elements of construction and the combination of parts herein shown.

Having fully described our invention, what we claim, and desire to secure by Letters Pat-Patent is the following:

1. The combination, in a lighting device, of a disk having ignitible pellets or fulminates arranged on each side thereof, and means whereby the disk may be revolved and the pellets or fulminates on either side ignited, substantially as shown and described.

2. In a lighting device, the disk L, having a row of ignitible pellets or fulminates arranged on both sides thereof, substantially as shown and described.

3. In a lighting device, a disk having ignitible pellets or fulminates arranged on both sides thereof and provided with perforations arranged in line, substantially as shown and described.

4. In a lighting device, the combination of the carrier-disk N, having spring-fingers attached thereto, the ignitible pellet or fulminate carrier having ignitible pellets or fulminates arranged on both sides thereof and provided with perforations through which the spring-fingers pass, substantially as shown and described.

5. In a lighting device, the combination of the intermittently-revoluble disk N, having the spring-fingers X, curved as shown, attached thereto, and the ignitible pellet or fulminate carrier having perforations through which the fingers X pass, substantially as shown and described.

6. In a lighting device, the combination of the intermittently-revoluble carrier-disk having the spring-fingers attached thereto and projecting therefrom, the disk being mounted on a pinion which projects in the same direction as the fingers, and the ignitible pellet or fulminate carrier having perforations through which the pinion and fingers pass, substantially as shown and described.

7. A lighting device having two hinged sides and a hinged cover, one of the sides being provided with an ignitor and the other with a reservoir having a hinged cover, the cover being provided with an opening through which the wick passes, the construction and arrangement being such that when the sides are closed together the wick is brought into proximity to the ignitor, substantially as shown and described.

8. A lighting device having two hinged sides, one of the sides being provided with an ignitor and the other with a reservoir having a hinged cover, the hinged cover being provided with an opening through which the wick passes, the construction and arrangement being such that when the sides are closed together the wick is brought into proximity to the ignitor, substantially as shown and described.

9. In a lighting device, a fulminate-carrier provided with means for advancing the same step by step, in combination with a curved flat spring-scratcher for igniting the fulminates, one end of which is attached to the device in such a manner as to bring the other or free end in contact with the carrier and ignite the fulminates thereon as the carrier is advanced step by step, substantially as shown and described.

10. In a lighting device, the combination of a disk having ignitible pellets or fulminates arranged on both sides thereof, a carrier capable of intermittent motion, on which said disk is mounted, and means for revolving the disk step by step and igniting the pellets or fulminates, the construction and arrangement being such that the disk may be reversed and the pellets or fulminates on either side thereof ignited, substantially as shown and described.

11. A lighting device having hinged sides, one of which is provided with a fulminate-carrier and means for advancing the same step by step, and the other with a curved spring-scratcher, one end of which is attached to one of the sides below the point of ignition and the other or free end of which extends upward and is curved, so as to come in contact with the pellets or fulminates on the carrier when the latter is advanced step by step, substantially as shown and described.

12. A lighting device having a chamber or reservoir provided with a hinged cover, the cover being provided with an opening through which the wick passes, and an ignitor consisting of a fulminate-carrier and means for igniting the fulminates, the construction being such that when the cover of the reservoir is closed the wick is brought into proximity to the ignitor, for the purposes set forth.

13. A lighting device having a chamber or reservoir provided with a hinged cover through which the wick passes, and an automatic ignitor, the construction being such that when the cover is closed the wick is brought into proximity to the ignitor, for the purposes set forth.

Signed at the city of New York, in the county of New York and State of New York, this 12th day of November, A. D. 1890.

ELIAS B. KOOPMAN.
WM. W. McKENNEY.

Witnesses:
HENRY M. BRIGHAM,
C. L. DAVIS.